United States Patent
Malaiyandi et al.

(10) Patent No.: US 7,783,598 B1
(45) Date of Patent: Aug. 24, 2010

(54) AVOIDING FROZEN-VOLUME WRITE PENALTIES

(75) Inventors: Prasanna K. Malaiyandi, Sunnyvale, CA (US); David A. Grunwald, Santa Clara, CA (US); Stephen Wu, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 305 days.

(21) Appl. No.: 11/741,707

(22) Filed: Apr. 27, 2007

(51) Int. Cl.
  *G06F 7/00* (2006.01)
(52) U.S. Cl. ......... 707/610; 709/229; 711/100
(58) Field of Classification Search ............ None
  See application file for complete search history.

(56) References Cited

U.S. PATENT DOCUMENTS

| | | | |
|---|---|---|---|
| 7,069,401 B1 * | 6/2006 | Noonan et al. ............ | 711/162 |
| 2003/0084242 A1 * | 5/2003 | Strange et al. ............ | 711/114 |
| 2003/0182503 A1 * | 9/2003 | Leong et al. ............ | 711/114 |
| 2005/0256859 A1 * | 11/2005 | Keohane et al. ............ | 707/4 |
| 2006/0085471 A1 * | 4/2006 | Rajan et al. ............ | 707/102 |
| 2008/0183988 A1 * | 7/2008 | Qi ............ | 711/162 |

* cited by examiner

*Primary Examiner*—Don Wong
*Assistant Examiner*—Shyue Jiunn Hwa
(74) *Attorney, Agent, or Firm*—Blakely, Sokoloff, Taylor & Zafman LLP

(57) ABSTRACT

Methods of operating a computer storage system where an identical copy of a mirror source filesystem is maintained on a mirror destination storage volume managed by a mirror destination server. A modification to the mirror source filesystem is planned and executed, and a corresponding change to the mirror destination filesystem is accomplished by storing data directly to the mirror destination storage volume, bypassing filesystem logic that interprets the data stored on the volume. Systems that implement these methods are also described.

17 Claims, 9 Drawing Sheets

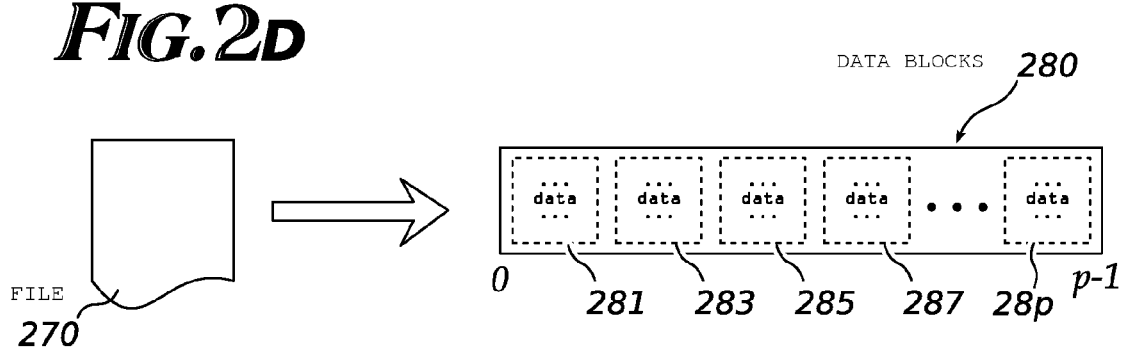

AVOIDING FROZEN-VOLUME WRITE PENALTIES

FIELD

The invention relates to data storage management procedures. More specifically, the invention relates to improving the performance of data storage protection systems.

BACKGROUND

Contemporary data processing systems often produce or operate on large amounts of data—commonly on the order of gigabytes or terabytes in enterprise systems. Since the data may be critical to the operation of a business or other enterprise, many techniques have been developed to prevent data loss or impaired access. One basic approach is to copy all of the data to a secondary storage medium such as magnetic tape or disks or optical disks. This backup strategy has many drawbacks: copying large amounts of data is time-consuming, and applications using the data may have to be disabled during the backup to avoid introducing data inconsistencies that would render the backup useless. Full backups may take hours or clays to complete, and a similar amount of time to restore. Also, backups only preserve data stored at the point in time the backup is made. Changes introduces afterward are unprotected and may be lost until the next backup completes successfully.

Incremental backup strategies, where only data that has changed since a previous incremental or full backup, can reduce the amount of time and storage required for a backup, at a cost of increased complexity and recovery time. Nevertheless, even incremental backups cannot provide protection for new data and data modifications stored between backups. To reduce the amount of data "at risk," system designers are turning to data mirroring schemes. In a mirror, a complete copy of the data on a source volume is maintained on a destination volume. The destination storage is managed by an independent system, often located in a completely different physical datacenter. Mirror operations may be arranged so that the mirror is only a few minutes or even just a few seconds out-of-date, so only data created or changed during that short time span may be lost due to a catastrophic failure. Some mirrors operate synchronously: they are always up to date.

Unfortunately, closely-coupled systems such as a mirror source and mirror destination may tend to affect each other in detrimental ways also. For example, in a synchronous mirror, if the destination is busy and cannot complete a mirror transaction immediately, the source may be delayed as well. To avoid this sort of cascade effect, mirror data may be written to a temporary file and "replayed" later when the mirror destination is capable of processing the transaction. However, writing to the temporary file, re-reading the temporary file, and (eventually) writing the data to the mirror consumes additional mirror destination processing and input/output ("I/O") resources, which may cause additional delays in normal mirror transaction processing.

Storage server operational schemes that insulate cooperating servers from one another, without imposing significant additional loads upon either, may improve overall system performance in many environments.

SUMMARY

A mirror destination storage server maintains an identical copy of a mirror source filesystem based on mirror transaction data received from a storage server that manages the source filesystem. Mirror source operations to prepare the mirror transaction data permit the mirror destination to save the data in its final location, even if normal write access to the mirror volume is suspended during housekeeping (or other) activity at the destination. Thus, mirror destination delays do not hold up the source server, yet no "extra" write/read/replay processing is required. Source and destination server operations (even synchronous mirror operations) are decoupled at minimal processing cost and without reduction in the data protection afforded by the mirror.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIGS. 2A-2D illustrate data structures and arrangements that are present in a block-based or filesystem-based data storage system.

DETAILED DESCRIPTION

Embodiments of the invention arrange filesystem operations to prevent some delays at one system from "backing up" and causing delays at another system. In an environment where filesystem logic at one storage server may occasionally suspend write activity to a filesystem (e.g., during a cache flush or a data backup), another storage server that depends on being able to write to the "frozen" filesystem may be forced to wait. To avoid being slowed clown by conditions at another storage server, filesystem operations are planned so that new or modified data can safely be written, even to a frozen filesystem. The write operation can store data directly on a hard disk or in a container file, bypassing the filesystem logic that enforces the frozen or suspended state. In addition, unlike existing approaches to solve similar problems, an embodiment of the invention requires no time-consuming "catch up" process after write access to the filesystem is restored. The data is already in the right place and available for immediate use.

Figure 1:
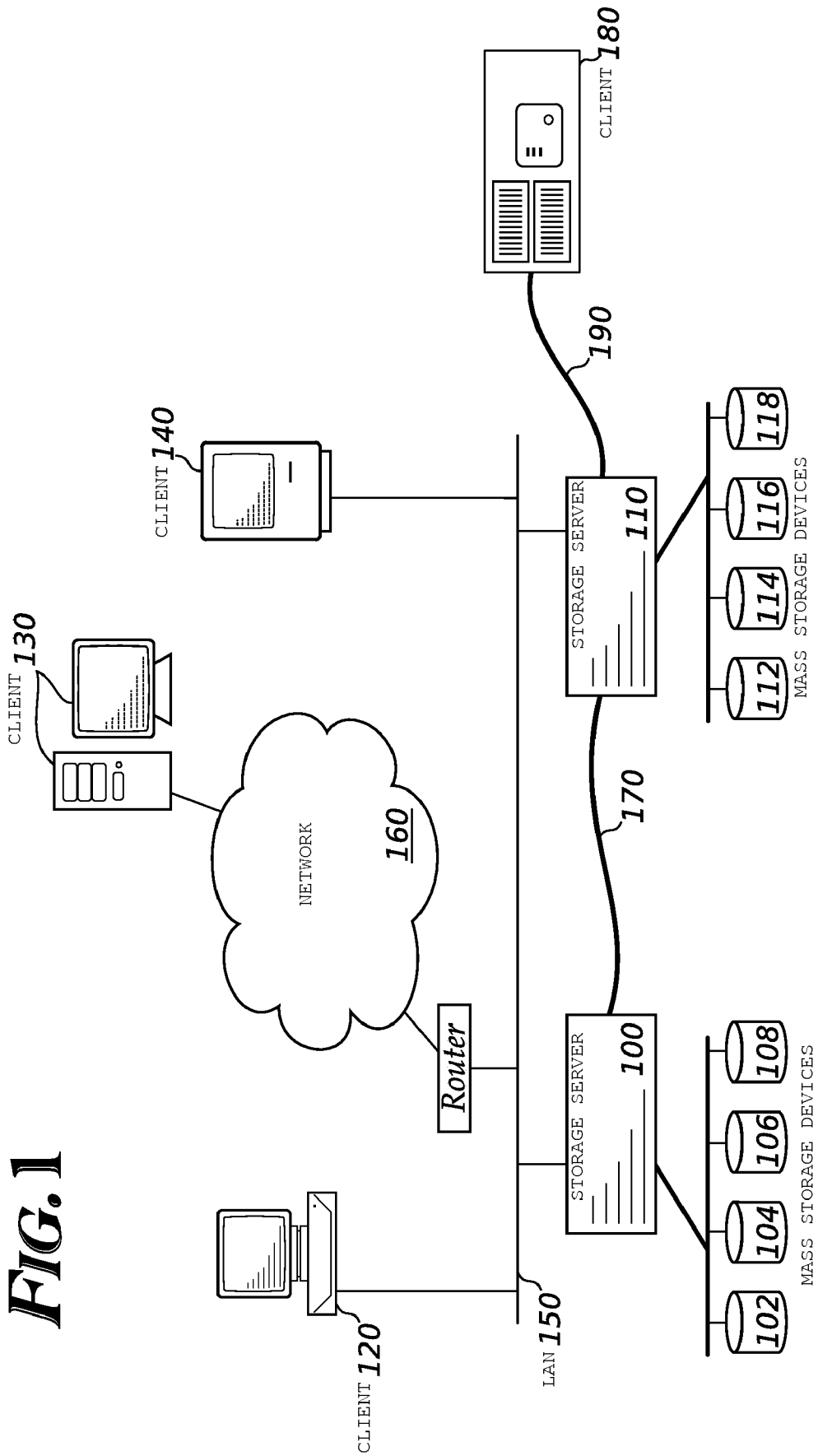
FIG. 1 shows a network environment where an embodiment of the invention is deployed.

FIG. 1 shows an environment where an embodiment of the invention operates. Two network-accessible storage servers 100 and 110 provide data storage services to clients 120, 130 and 140. Clients transmit requests to read or write data, or to perform other storage-related operations (e.g., create, rename or delete files or directories) over a network such as local area network ("LAN") 150 or distributed data network 160, and receive responses from the server. Servers 100 and 110 store data on mass storage devices 102-108 and 112-118 (respectively); these devices may be operated as Redundant Arrays of Independent Disks ("RAID arrays") by software and/or hardware in the servers. Servers 100 and 110 may have a dedicated communication channel 170 through which they can exchange data and control information, as described below. This arrangement may be useful if, for example, server 110 is configured to operate as a mirror of server 100 (i.e. to maintain an identical copy of some of the data stored on server 100).

Server 110 also provides data storage services to a client 180 which connects via another interface 190. This interface may be one that conventionally connects systems with physical mass storage devices. For example, interface 190 may be a Small Computer System Interface ("SCSI") or a Fiber Channel ("FC") interface. Server 110 emulates a mass storage device attached to such an interface, so client 180 may be unaware that its data is actually being stored under the control of server 110. In this arrangement, server 110 provides block-oriented storage services to client 180. The client is responsible for maintaining any filesystem it desires within the blocks of storage provided by server 110.

Dedicated communication channel 170 may be operated in either direction, so server 100 may provide mirroring services to server 110. Thus, data in the block-oriented storage used by client 180 may be replicated on the mass storage devices connected to server 100.

Since storage servers 100 and 110 each provide data storage services to their own clients, as well as mirroring services to each other, the servers' operations will not be synchronized, and "housekeeping" functions such as cache flushes will occur on each server according to the server's own needs, irrespective of the activity at the other server. Neither server can count on its peer being able to store or retrieve data (e.g. mirror-related data) immediately, so the servers' interactions are guided according to an embodiment of the invention so that delays at one server do not impact the other server's responsiveness to its clients.

Figure 2A:
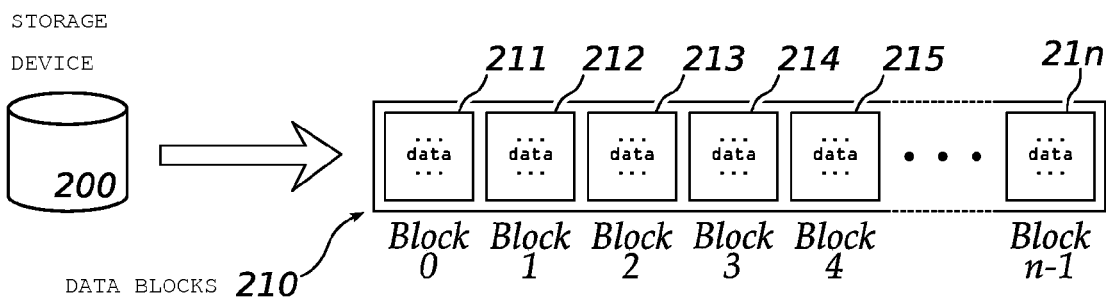

FIGS. 2A-2D provide a brief overview of some of the data structures and operational procedures that will be discussed in the following descriptions of embodiments of the invention. As shown in FIG. 2A, a mass storage device 200 such as a hard disk drive may be viewed as a sequence or array 210 of data blocks 211, 212, 213 . . . 21n. Each data block stores a plurality of data bytes. Data blocks containing 512 bytes, 1024 bytes or 4096 bytes are common, although other sizes may be encountered as well. Data blocks are addressed by an integer index: the first data block is block 0, the second is block 1, and so on, through the last data block n−1 on a device containing n blocks. Several physical mass storage devices may be operated together by hardware or software that creates a composite mass storage device having faster access, improved fault tolerance, or simply more storage space than any one of the physical devices individually. Such a composite device (for example, a RAID array) will be treated herein as a single mass storage device providing an array of data storage blocks.

Figure 2B:
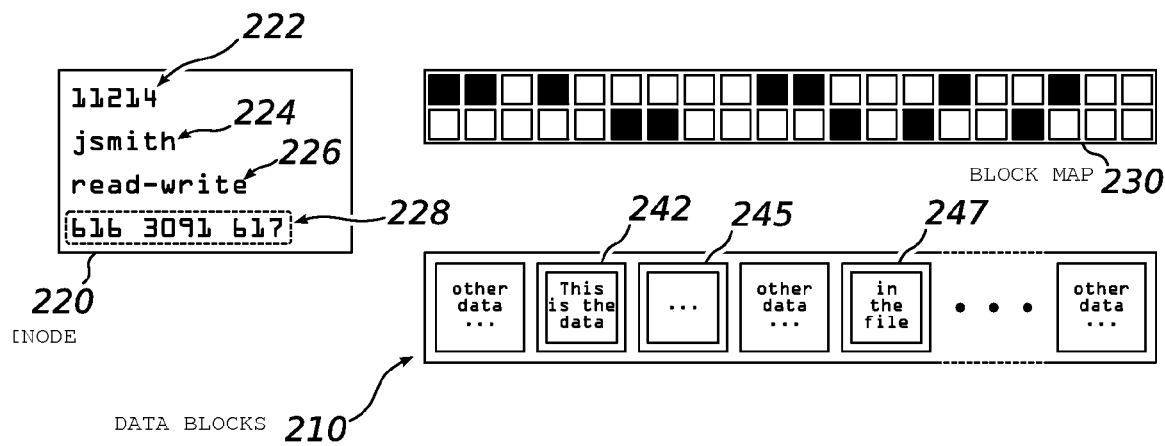

Some systems or applications store their data directly in the data blocks of a mass storage device, but the storage space available in a device is more often subdivided and allocated among various purposes. A system manages the raw data blocks of a mass storage device with a set of data structures called a "filesystem." FIG. 2B shows two data structures that form the basis of a generic filesystem. A first data structure called an "inode" 220 stores metadata about a sequence of stored data bytes (a "file"): the length of the sequence 222, the owner of the sequence 224, the sequence's access rights 226, and a list of data block indices 228 identifying data blocks that contain the file's data. (Inodes are often of a fixed size, so an arbitrarily-long list of data blocks cannot be stored. To accommodate large files containing many data blocks, an inode may indicate one or more "indirect" blocks, each of which contains many indices of "direct" blocks that contain the file's data. For extremely long files, additional levels of indirection may be added.) A second data structure 230, called a "block map," stores information indicating whether each data block of a mass storage device is used or free. Filesystem logic can refer to the information in inode 220 and block map 230 to find data blocks 242, 245, 247 in the array of data blocks 210; the content of those data blocks is the data in the file described by inode 220. Inode data and block map data are often stored in the array of data blocks 210 alongside file data. Thus, a mass storage device can contain all the information needed to describe the logical arrangement of the data it contains, along with the data itself.

A filesystem often provides a hierarchical view of the files it contains, allowing files to be grouped together into directories, which may themselves be grouped with other files and directories in higher-level directories. (This hierarchical structure is not shown in FIG. 2B.) A directory may be thought of as a file that contains a list of file names and pointers to modes that identify the contents of those files.

A hierarchical file system has a "root" directory, from which all the files and directories in the filesystem may be located. Blocks and modes that are not reachable by following pointers and references from the root directory are usually expected to be unused; if they are not marked "free" in the block map, they are sometimes said to be "lost." However, such modes and blocks are not inconsistent with the overall structure of the filesystem in a way that would cause corruption of data in the filesystem or data in the "lost" blocks.

Figure 2C:
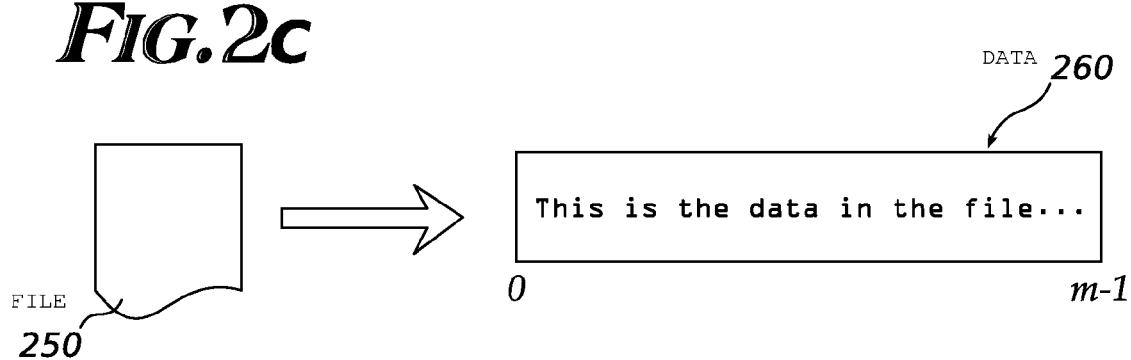

FIG. 2C shows a file 250 that might be described by inode 220 of FIG. 2B. File 250 is simply a sequence of data bytes 260 running from zero to m−1, where m is the size of the file.

FIG. 2D illustrates that a file 270, which is a sequence of data bytes 280 from zero to p−1, can be dealt with as a series of chunks or segments 281, 283, 285 . . . 28p, each of a predetermined length. These segments are very much like the array or sequence of data blocks 211-21n shown in FIG. 2A, and indeed, a file can be treated as a kind of pseudo-mass storage device, within which a filesystem can be constructed. A file containing a filesystem is called a "container file."

Figure 3:
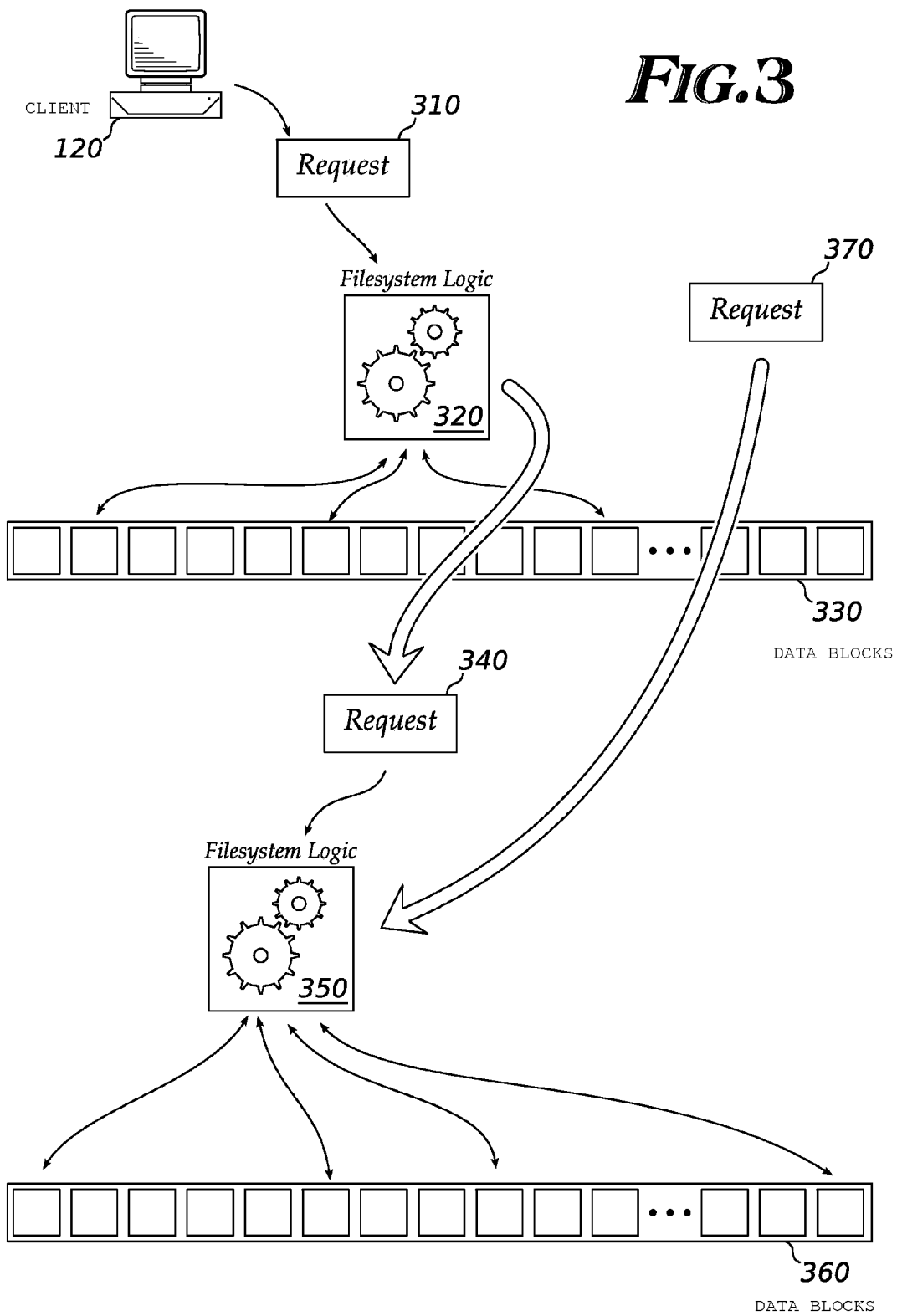
FIG. 3 shows how file requests may be processed to store or retrieve data on a mass storage device according to an embodiment of the invention.

FIG. 3 shows a client 120 issuing a request 310 (e.g. a request to read or write data in a file). The request is processed by filesystem logic 320, which refers to blocks in an underlying array of data blocks 330 to execute the request. However, data blocks 330 may actually be stored within a container file in a lower-level filesystem. In this case, filesystem logic 320 may issue a second request 340 to lower-level filesystem logic 350, which refers to data in an array of data blocks 360 to execute request 340. Note that it may be possible to issue a request 370 directly to the lower-level filesystem logic 350, bypassing filesystem logic 320, and read or write directly to the container file. Of course, request 370 should respect the data structures created by filesystem logic 320 within the container file, or filesystem logic 320 may be driven into an inconsistent state and may lose or corrupt data.

Figure 4:
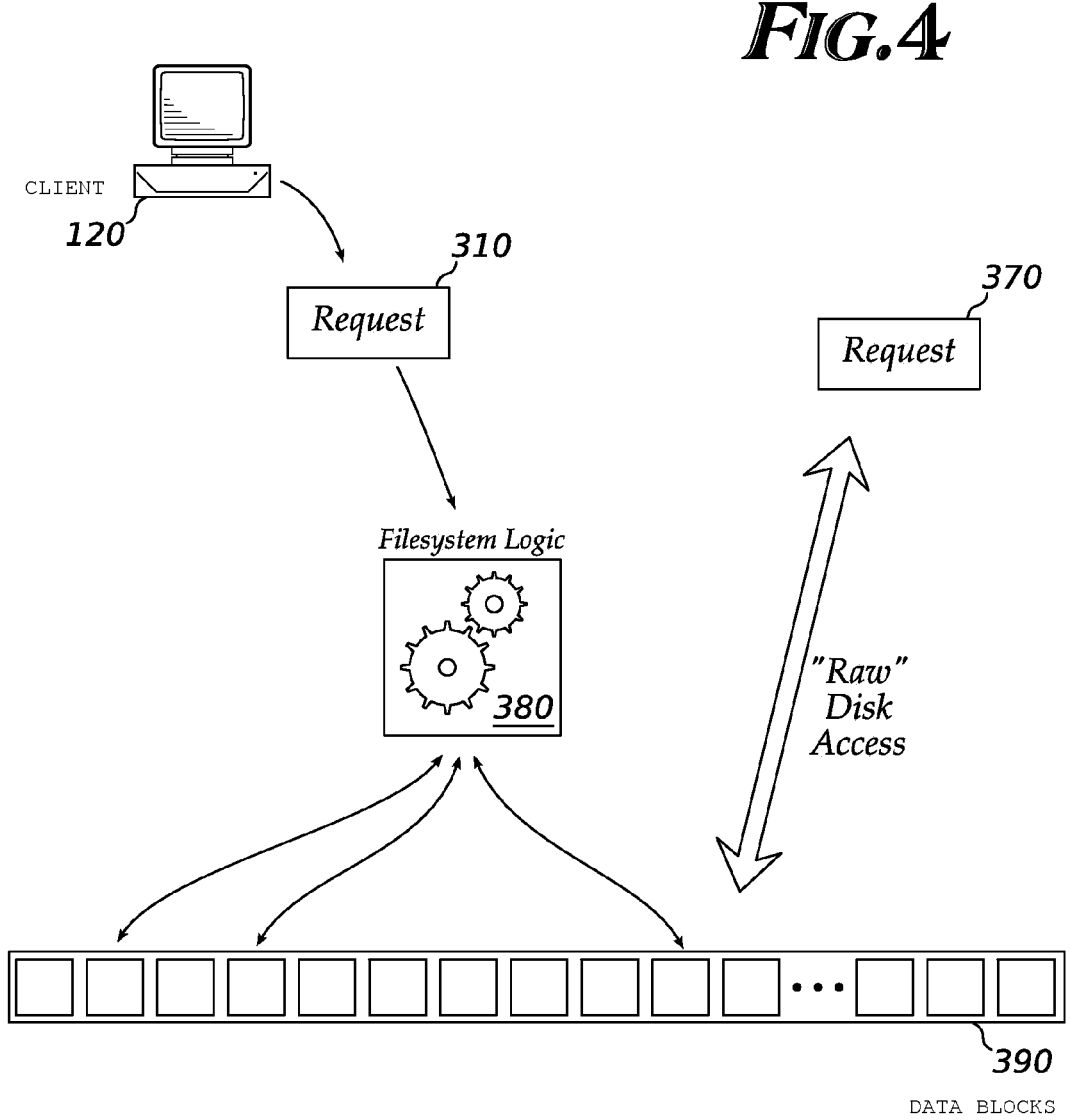
FIG. 4 shows another way that data may be stored or retrieved on a mass storage device.

FIG. 4 shows an environment similar to the one depicted in FIG. 3: a client 120 issues a request 310 to filesystem logic 380, which maintains filesystem data structures and user data in an array of data blocks 390 stored directly on a mass storage device. In this case, there is no "lower level" filesystem logic like element 350 in FIG. 3, and no container file. Nevertheless, a request 370 may be performed via a "raw"

disk access interface (e.g., via a disk driver that accepts indices of blocks on an underlying hard disk), bypassing filesystem logic 380 and directly reading or writing data blocks of the mass storage device. In this environment also, the process that issues request 370 must respect the data structures created and maintained by filesystem logic 380 to avoid damaging the filesystem.

It is appreciated that practical filesystems may maintain more or different data structures than those described with reference to FIGS. 2A-2D, 3 and 4. However, the basic concepts: a mass storage device as a series of data blocks, and a filesystem containing metadata structures (e.g., inodes) describing files and a block map identifying used and unused data blocks, will have analogs in most practical systems, and the techniques of embodiments of the invention can be adapted by those of ordinary skill in the relevant arts.

Figure 5:
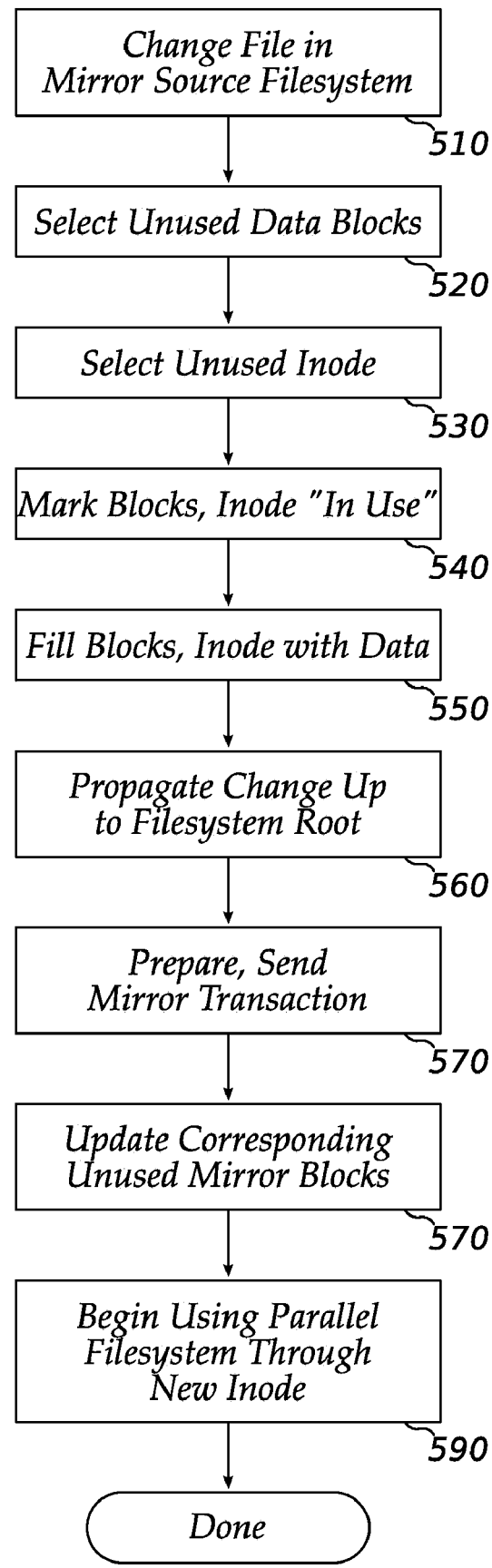
FIG. 5 outlines a method of maintaining a mirror filesystem according to an embodiment of the invention.

FIG. 5 is a flow chart outlining operations of filesystem logic in a mirrored environment. An underlying assumption in this example is that the mirror source and mirror destination systems have data buffer caches to streamline write operations, and that the systems occasionally pause briefly to flush "dirty" buffers (buffers containing modified data blocks) from cache memory to long-term storage on one or more mass storage devices. When dirty buffers have been flushed, the filesystem data structures stored on disk are completely consistent, so cache flush events are called "consistency points" ("CPs"). When the mirror destination system is performing a CP, its filesystems may be "frozen," and clients' write requests (and mirror transactions from the mirror source) may be delayed briefly until the CP is complete and the filesystems are "thawed." Such delays may be insignificant from the perspective of any particular client, but if the mirror source is delayed, all of its clients may suffer delays in transactions on the mirror source filesystem. The following method avoids such delays.

A transaction at the mirror source server triggers a change to a file in the mirror source filesystem (510). The mirror source server selects unused data blocks to contain the modified data (520) and an unused inode to describe the modified file (530). The selected blocks and inode are marked "in-use" (540) and filled with appropriate data (550). (I.e. the data blocks are filled with the modified data, and the inode is set to refer to the data blocks. If the file is several blocks long, unmodified blocks may be listed in both the inode that referred to the pre-change version of the file, and the newly-allocated inode. Thus, the unmodified blocks are shared between the two files, and the two inodes identify the pre- and post-change versions of the file.)

The change to the file "bubbles up" through the directory hierarchy to the root directory (560): unused blocks and unused inodes are allocated and filled to create a "parallel" hierarchy that filesystem logic could process to reach and access the modified file. Most data blocks can be shared between the original (pre-change) and parallel (post-change) filesystems, so relatively few additional data blocks and inodes are consumed. A result of this process is a newly-allocated (previously unused) inode that is the root of a new directory hierarchy containing the changed file, plus all the other directories, files and data in the original filesystem. No data blocks or inodes that are part of the original filesystem are modified, so the creation of the parallel filesystem is completely invisible to logic and processes working with the original filesystem.

A mirror transaction targeting the unused blocks and inodes is prepared and sent to the mirror destination server (570). Since the mirror destination is an identical copy of the mirror source, the blocks and inodes will be unused at the destination as well. The mirror destination server stores data from the mirror transaction onto a storage volume containing the mirror destination filesystem (580). The mirror transaction can safely bypass logic to interpret the mirror destination filesystem because the mirror source logic limited its modifications to unused blocks and inodes—just as the parallel hierarchy is invisible at the mirror source server, it is also invisible at the mirror destination server. Therefore, even if write access at the mirror destination server is suspended due to a CP or for another reason, the mirror transaction can write data directly to the storage volume (e.g. a container file or a raw disk device) without delaying until the CP is complete.

Finally, the mirror source and destination systems can begin to use the root inode of the parallel filesystem as the root of the "current" filesystem (590). Switching to this inode is causes the data modifications initiated at 510 to "merge" into the current filesystem automatically. The old root inode and its hierarchy can be maintained to provide access to older versions of files, or the inode and any data blocks not shared with the new filesystem may be reclaimed for use in subsequent operations.

Writing information that applications wish to store while the destination filesystem is frozen, to unused areas of the filesystem through an alternate logic path, as described above, is advantageous in comparison to writing the information to a "look-aside" file or storage device elsewhere, and "replaying" the information later, after the filesystem is thawed. In the alternate "look-aside" method, the modifications must be written once to a temporary storage location, then re-read and written again into the filesystem. This requires extra read and write operations that consume processing cycles and I/O bandwidth. By writing the data, formatted correctly for the filesystem, to unused areas of the filesystem's storage, most of the re-read and re-write activity mentioned above can be avoided because the data is already where it would (or could) have been stored after the re-read and re-write.

The high-level operational description presented with reference to FIG. 5 mentions "bypassing" filesystem logic to write to the underlying container file or mass storage device. However, even the "bypass" logic must be able to interpret existing filesystem data structures and create correctly-formatted structures in unused storage areas. Therefore, a practical implementation of an embodiment of the invention may not provide a wholly separate filesystem access mechanism, but may simply include additional logic within the existing filesystem logic, to perform the methods outlined above while the filesystem is frozen.

Figure 6A:
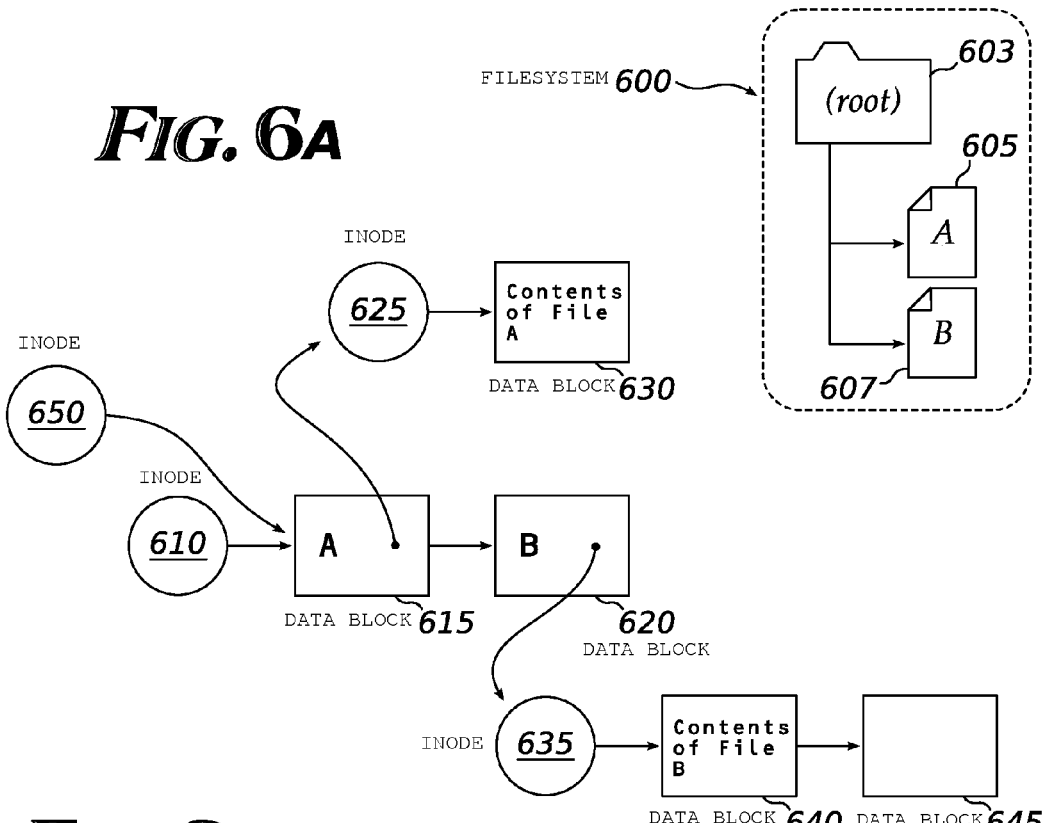
FIGS. 6A and 6B show a before-and-after example of a filesystem structure when a modification occurs while the filesystem is frozen.
Figure 6B:
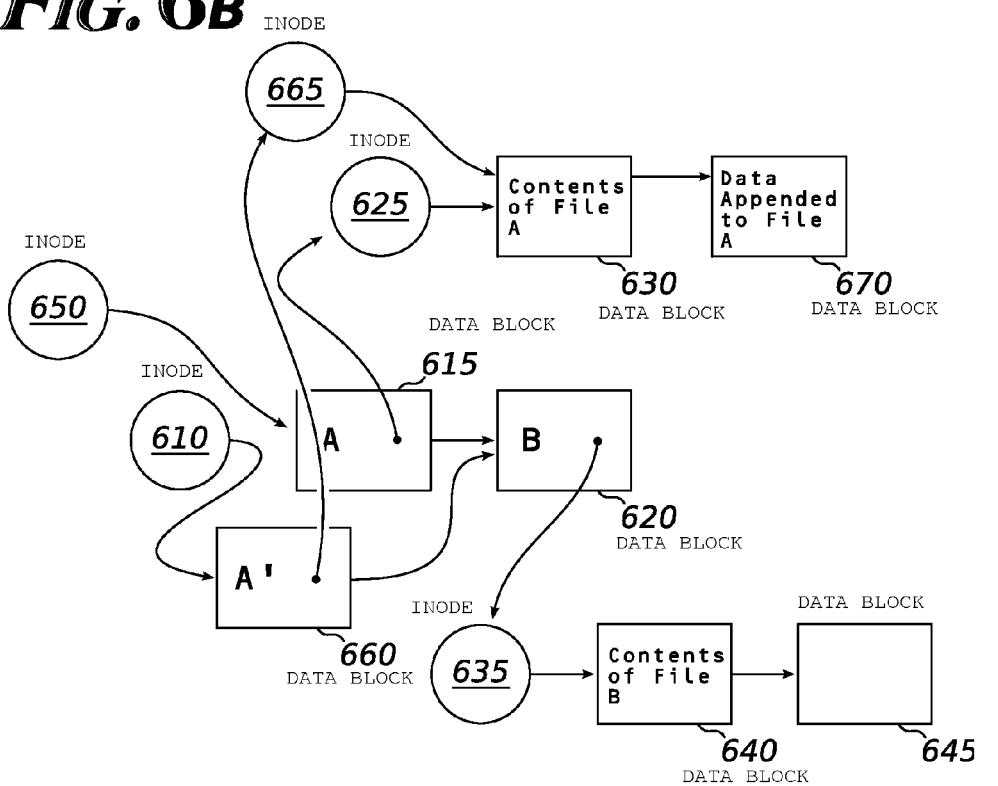

FIGS. 6A and 6B shows the progression of a mirror filesystem's in-memory and on-disk contents according to one embodiment of the invention. In FIG. 6A, inset 600 shows the filesystem as "folders and documents" icons: a root directory or folder 603 contains two files, A 605 and B 607. The underlying filesystem data structures include a root-directory inode 610, which contains information to find blocks 615 and 620. These blocks contain filenames and other information to permit the inodes associated with files A and B to be located. Inode 625, which is associated with the filename "A," identifies block 630, which contains the data in file A. Inode 635, associated with filename "B," identifies blocks 640 and 645. Filesystem logic maintains an in-memory copy of root inode 610, identified in FIG. 6A as element 650.

FIG. 6B shows how the filesystem data structures may change if data is appended to file A while the filesystem is frozen. The in-memory inode 650 continues to indicate directory blocks 615 and 620, which are unchanged. Files A and B, if accessed through inodes 625 and 635, also appear unchanged. Thus, logic examining the filesystem through in-memory root inode 650 will not detect the change to file A.

According to an embodiment of the invention, previously-unused inode 665 and previously unused blocks 660 and 670 will be written with new data. Inode 665, which is associated with the modified file A ("A'"), identifies blocks 630 and 670 as belonging to the file. In addition, block 660 identifies inode 665. In this example, only inode 610 is modified (to identify blocks 660 and 620 in the root directory). However, because mirror filesystem logic maintains in-memory inode copy 650, the modification to inode 610 will not cause any disruption to file operations referring to the frozen volume and performed through the filesystem logic. In another embodiment, inode 610 might also remain unmodified. Instead, a new (unused) inode would be allocated and initialized to describe the new root directory containing files A' and B. In this embodiment, "refreshing" the filesystem logic may involve beginning to access the mirror filesystem through this new root inode.

Although the block map data structure is not shown in these figures, note that the data block(s) containing the block map would be modified to indicate that blocks 660 and 670 are "in use." This modification poses no risk of confusing the filesystem logic or corrupting the filesystem, since the block map entries are not referential—they merely describe a binary state ("free" or "in use") of each block.

When the mirror volume is unfrozen, the new contents of inode 610 may be loaded into memory, and files A' and B will immediately become available. At this point, inode 625 and block 615 may no longer be needed, so may be reclaimed.

The operational example described with reference to FIGS. 6A and 6B is simplified for ease of comprehension. A modification to a file located several levels down from the root directory may result in the allocation and linking of many unused inodes and data blocks. Furthermore, an embodiment may keep additional data about modifications that occur while the mirrored filesystem is frozen, to simplify recovery if read or write errors, or a system crash, occurs after a frozen filesystem is modified, but before the filesystem logic updates its in-memory inode. For example, a time of modification or a sequence number may be associated with each unused block or inode that is placed into service while the mirror filesystem is frozen. This information may permit the mirror state to be rolled forward incrementally to any state from just after the freeze to just before the thaw.

One example of filesystem logic that can easily be extended to operate as described above is logic to implement the Write Anywhere File Layout ("WAFL"), a filesystem structure that includes some of the features described in U.S. Pat. No. 5,819,292 issued to David Hitz, et al. Other filesystems also use inodes, block maps, and procedures like those described earlier. Even if these other filesystems lack the full flexibility of WAFL, the methods of embodiments of the invention can be applied. As noted above, the parallel filesystem created in unused blocks of an existing filesystem is like a set of lost files and directories that may be detected within a filesystem that has experienced minor corruption. However, these "lost" files are created intentionally, and a specific procedure for "finding" them and merging their data into the active filesystem permits an embodiment of the invention to decouple mirror source and destination operations. Neither the data in the active filesystem, nor the data in the "lost" files, is at risk, because all the key data structures (inodes and block map) are consistent. Filesystems such as FAT ("File Allocation Table") and VFAT, NTFS ("New Technology File System"), and HFS ("Hierarchical File System") and its descendants can all support embodiments of the invention.

Figure 7:
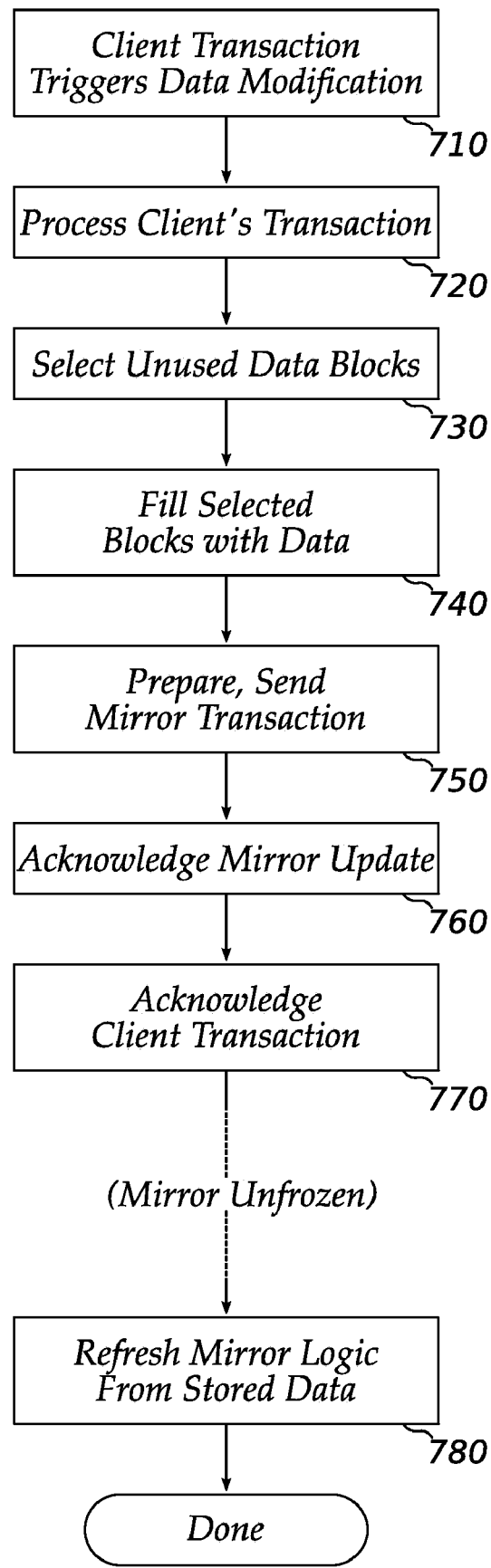
FIG. 7 describes mirror source and destination operations according to an embodiment of the invention.

FIG. 7 outlines a method according to an embodiment of the invention, viewed from another perspective. As in the method of FIG. 5, a client transaction (or internal storage server procedure) initiates a change to a file in a mirror source filesystem (710). The mirror source server plans filesystem changes that will result in the changed file becoming part of the active filesystem (720). However, all the filesystem changes avoid currently in-use blocks and inodes. Therefore, when the changes are stored (730), the altered file does not immediately become visible.

Data corresponding to the planned changes is transmitted to a mirror destination system (740), where it is stored directly into a container file or mass storage device containing the mirrored filesystem (750). Filesystem logic at the mirror destination system need not be involved in planning or executing the changes to the mirror filesystem. The changes are planned once, but written twice, to mass storage subsystems of different servers. Finally, the updated data is merged into both source and destination mirror filesystems (760) by updating filesystem logic state at each storage server.

It is appreciated that an embodiment of the invention may assist in maintaining mirrored filesystems at two or more mirror destination servers: the mirror source server may send change data to several destination servers, or the first destination server may forward the data on to a second destination server. In these environments, filesystem changes are planned once, but written three or more times.

Figure 8:
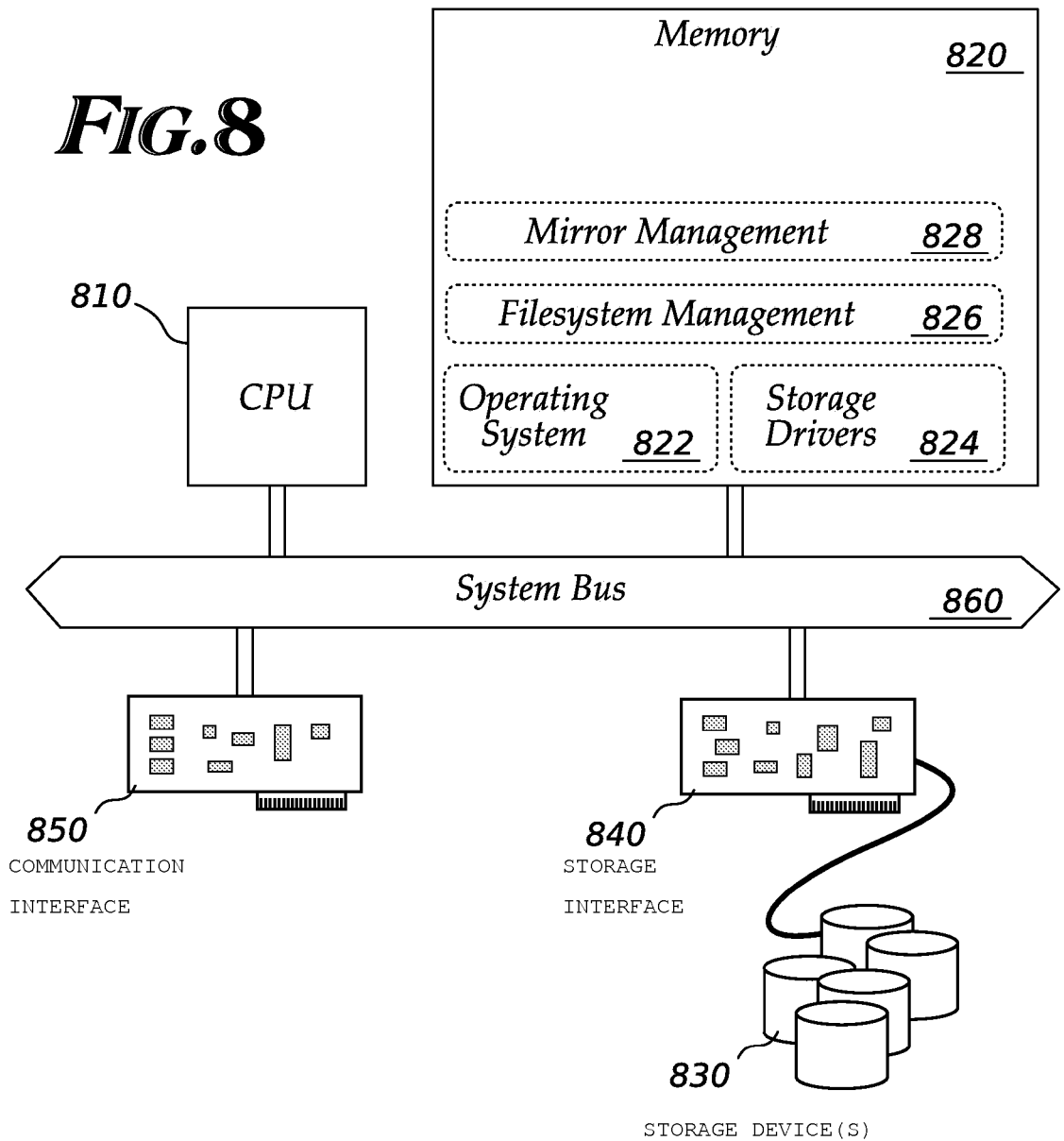
FIG. 8 shows some components and subsystems of a storage server that implements an embodiment of the invention.

FIG. 8 shows some components and subsystems of a storage server that implements an embodiment of the invention. A programmable processor ("central processing unit" or "CPU") 810 executes instructions stored in memory 820 to perform methods like those described above. Memory 820 may contain data and instructions ("software") to implement various logical functions. For example, operating system 822 manages and controls the system's hardware resources. Storage drivers 824 permit data to be written on and read from mass storage devices. Filesystem management logic 826 maintains appropriate data structures so that clients' data can be stored on, and retrieved from, the mass storage available to the system. Several levels of filesystem logic may be provided in some situations: a level to manage one or more container files, and another level to construct and manage filesystems within the container files. Filesystem logic 826 may use the Write Anywhere File Layout ("WAFL"). Mirror management logic 828 coordinates with similar mirror management logic in another system to maintain an identical copy of a filesystem, stored within a mirror destination volume at the other system.

The system shown here includes a mass storage device interface 840, which provides low-level access to a plurality of mass storage devices such as hard disks 830. In some embodiments, mass storage device interface 840 may operate hard disks 830 as a Redundant Array of Independent Disks ("RAID array") to obtain improved throughput, increased storage reliability and/or increased storage capacity. As one of skill in the art will immediately appreciate, a machine-readable storage medium may include hard disks. A communication interface 850 such as an Ethernet or Fiber Channel interface permits the system to communicate with other systems. These components exchange data and control signals over a system bus 860.

An embodiment of the invention may be a machine-readable medium having stored thereon instructions which cause a programmable processor to perform operations as described above. In other embodiments, the operations might be performed by specific hardware components that contain hard-wired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROM), Read-Only Memory (ROM), Random Access Memory (RAM), and Erasable Programmable Read-Only Memory (EPROM).

The applications of the present invention have been described largely by reference to specific examples and in terms of particular allocations of functionality to certain hardware and/or software components. However, those of skill in the art will recognize that frozen-volume write penalties can also be avoided by software and hardware that distribute the functions of embodiments of this invention differently than herein described. Such variations and implementations are understood to be captured according to the following claims.

We claim:

1. A method comprising:
   maintaining a mirror destination filesystem that is an identical copy of a mirror source filesystem, the mirror destination file system stored on a mirror destination storage volume;
   freezing the mirror destination filesystem on the mirror destination storage volume to prevent modifications to the mirror destination filesystem;
   receiving data describing a change to the mirror source filesystem;
   writing, by a computer, the data directly to an unused block on the mirror destination storage volume by bypassing logic that interprets the mirror destination filesystem on the mirror destination storage volume, wherein the writing occurs while the mirror destination filesystem is frozen;
   unfreezing the mirror destination file system; and
   merging the change to the mirror destination filesystem into an active version of the mirror destination filesystem after unfreezing the mirror destination file system.

2. The method of claim 1 wherein said storing affects a block of the mirror destination storage volume that is marked unused within a logical structure of the mirror destination filesystem.

3. The method of claim 1 wherein the mirror destination storage volume is a container file.

4. The method of claim 1 wherein the mirror destination storage volume is one of a disk or a Redundant Array of Independent Disks ("RAID array").

5. The method of claim 1 wherein the mirror source filesystem and mirror destination filesystem are compatible with one of a New Technology File System ("NTFS") structure, a File Allocation Table ("FAT") structure, a VFAT structure, or a Hierarchical File System ("HFS") structure.

6. A method comprising:
   identifying a block of a first mass storage device that is unused by a first filesystem stored on the first mass storage device;
   freezing a second filesystem stored on a second mass storage device in a consistent state;
   disallowing modifications to the second filesystem while the second filesystem is frozen;
   storing, by a computer, new data in a corresponding unused block of the second mass storage device by writing directly to the second mass storage device, in a format compatible with a structure of the second filesystem, wherein the identifying and storing occur while the second filesystem is frozen;
   unfreezing the second file system; and
   updating a filesystem logic state so that the data merges into the second filesystem, wherein the updating occurs after unfreezing the second file system.

7. The method of claim 6 wherein the second mass storage device is one of a disk drive, a Redundant Array of Independent Disks ("RAID array"), or a container file.

8. The method of claim 6, further comprising:
   marking the block as "in-use" within a data structure stored on the first mass storage device.

9. The method of claim 6 wherein a filesystem stored on the second mass storage device is an identical copy of the filesystem stored on the first mass storage device.

10. A system comprising:
    a mass storage device;
    filesystem logic to maintain a filesystem structure within data storage space of the mass storage device;
    frozen-volume write logic to write data on an unused portion of the mass storage device when the filesystem logic has disabled modifications to the filesystem and to bypass the filesystem logic; a communication interface to receive a request from a client, wherein the request is to modify a file in the filesystem while the filesystem logic has disabled modifications to the filesystem;
    unfreezing logic to enable modifications to the filesystem; and
    merging logic to merge the data into an active version of the filesystem after enabling modifications to the filesystem.

11. The system of claim 10, further comprising:
    mirror logic to cooperate with the filesystem logic and maintain an identical copy of a mirror source filesystem within the data storage space of the mass storage device.

12. The system of claim 10, further comprising:
    container-file filesystem logic to provide data storage in a container file, wherein the filesystem logic is to maintain the filesystem structure in the container file.

13. The system of claim 10, further comprising:
    memory to store a cached copy of a root inode of the filesystem structure.

14. The system of claim 10, further comprising:
    a Redundant Array of Independent Disks ("RAID array") interface to manage a plurality of mass storage devices as a RAID array.

15. A machine-readable storage medium storing data and instructions to cause a programmable processor to perform operations comprising:
    planning a change to a mirror source filesystem, said change to affect unused blocks of the mirror source filesystem;
    preparing data to effect the change;
    storing the data on a first mass storage subsystem;
    freezing a mirror destination filesystem stored on a mirror destination server in a consistent state;
    disallowing changes to the mirror destination filesystem while the mirror destination filesystem is frozen;
    transmitting the data to the mirror destination server to be written on an unused block in a second mass storage subsystem of said mirror destination server, wherein the storing operation occurs while the mirror destination filesystem is frozen;
    unfreezing the mirror destination filesystem;
    merging the change into an active version of the mirror destination filesystem after unfreezing the mirror destination filesystem.

16. The machine-readable storage medium of claim 15 wherein the mass storage device is one of a disk drive, a Redundant Array of Independent Disks ("RAID array"), or a container file.

17. The machine-readable storage medium of claim 15, containing additional data and instructions to cause the programmable processor to perform operations comprising:
    marking the unused blocks as "in-use" within a data structure stored on the mass storage device.

* * * * *